(12) United States Patent
Xu et al.

(10) Patent No.: US 12,375,772 B2
(45) Date of Patent: Jul. 29, 2025

(54) NETWORK LIVESTREAMING METHOD AND APPARATUS, STORAGE MEDIUM, AND ELECTRONIC DEVICE

(71) Applicant: Beijing Bytedance Network Technology Co., Ltd., Beijing (CN)

(72) Inventors: Yaxi Xu, Beijing (CN); Linxing Li, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/588,951

(22) Filed: Feb. 27, 2024

(65) Prior Publication Data
US 2024/0205507 A1 Jun. 20, 2024

Related U.S. Application Data

(63) Continuation of application No. PCT/CN2022/114555, filed on Aug. 24, 2022.

(30) Foreign Application Priority Data

Aug. 27, 2021 (CN) .......................... 202110998212.3

(51) Int. Cl.
*H04N 21/482* (2011.01)
*H04N 21/218* (2011.01)
(Continued)

(52) U.S. Cl.
CPC ....... *H04N 21/482* (2013.01); *H04N 21/2187* (2013.01); *H04N 21/4383* (2013.01)

(58) Field of Classification Search
CPC ............. H04N 21/2187; H04N 21/431; H04N 21/4347; H04N 21/4383; H04N 21/472; H04N 21/482
USPC ........................................................ 725/38
See application file for complete search history.

(56) References Cited

U.S. PATENT DOCUMENTS

| 6,675,386 B1 * | 1/2004 | Hendricks .......... | H04N 21/4758 |
| | | | 348/E7.071 |
| 2002/0108125 A1 * | 8/2002 | Joao .................... | H04N 21/4781 |
| | | | 348/E7.071 |

(Continued)

FOREIGN PATENT DOCUMENTS

| CN | 106254916 A | 12/2016 |
| CN | 106921864 A | 7/2017 |

(Continued)

OTHER PUBLICATIONS

International Search Report for PCT/CN2022/114555, mailed Nov. 15, 2022, 3 pages.

(Continued)

*Primary Examiner* — Dominic D Saltarelli
(74) *Attorney, Agent, or Firm* — Astute IP Law Group

(57) ABSTRACT

The present disclosure provides a livestreaming method and apparatus, a storage medium, and an electronic device. The method includes: receiving a plurality of livestreaming video streams, which correspond to a plurality of different viewing angles of the same livestreaming video; displaying a first video livestreaming page corresponding to a first livestreaming channel, the first video livestreaming page displaying a first identifier, the first livestreaming channel playing a first video corresponding to a first livestreaming video stream; in response to a first triggering operation for the first identifier, displaying a plurality of second identifiers, which correspond to the plurality of livestreaming video streams, on the first video livestreaming page; and in response to a second triggering operation for a target identifier, switching to a second livestreaming video stream corresponding to the target identifier to play a second video corresponding to the second livestreaming video stream in the first livestreaming channel.

16 Claims, 10 Drawing Sheets

(51) Int. Cl.
*H04N 21/2187* (2011.01)
*H04N 21/438* (2011.01)

(56) References Cited

U.S. PATENT DOCUMENTS

| | | | |
|---|---|---|---|
| 2004/0119815 A1* | 6/2004 | Soloff | H04N 21/488 348/39 |
| 2004/0197088 A1* | 10/2004 | Ferman | H04N 21/482 348/E5.067 |
| 2014/0101227 A1 | 4/2014 | Bieselt et al. | |
| 2018/0255332 A1 | 9/2018 | Heusser | |
| 2021/0092464 A1* | 3/2021 | Gupta | G06V 20/42 |

FOREIGN PATENT DOCUMENTS

| | | |
|---|---|---|
| CN | 108156467 A | 6/2018 |
| CN | 112243155 A | 1/2021 |
| CN | 113286201 A | 8/2021 |
| CN | 113301351 A | 8/2021 |
| JP | 2009141895 A | 6/2009 |
| JP | 2015197923 A | 11/2015 |
| KR | 1020160072714 A | 6/2016 |
| WO | 2019054360 A1 | 3/2019 |

OTHER PUBLICATIONS

Communication pursuant to Rules 70(2) and 70a(2) EPC for European Patent Application No. 22860544.0, mailed Oct. 15, 2024, 1 page.
Extended European Search Report for European Patent Application No. 22860544.0, mailed Sep. 26, 2024, 10 pages.
Notice of Reasons for Refusal for Japanese Patent Application No. 2023-577873, mailed on Jan. 28, 2025, 8 pages.

* cited by examiner

NETWORK LIVESTREAMING METHOD AND APPARATUS, STORAGE MEDIUM, AND ELECTRONIC DEVICE

CROSS-REFERENCE TO RELATED APPLICATION

The present application is a continuation of International Patent Application No. PCT/CN2022/114555, filed on Aug. 24, 2022, which claims priority of the Chinese Patent Application No. 202110998212.3, filed on Aug. 27, 2021, and the entire content disclosed by the aforementioned patent applications is incorporated herein by reference as part of the present application.

TECHNICAL FIELD

Embodiments of the present disclosure relate to the field of network technology, in particular to a network livestreaming method, a network livestreaming apparatus, and a computer-readable storage medium and an electronic device both for implementing the network livestreaming method.

BACKGROUND

With the development of mobile Internet, network livestreaming technology has become a hot spot currently. At present, the mainstream livestreaming mode is a mode that one live streamer broadcasts live while a plurality of viewers watch the livestreaming in a livestreaming room of the live streamer.

The current network livestreaming technology can only support broadcasting live the current livestreaming content from one live streamer, which has great limitations and is difficult to meet the requirements of professional live media content.

SUMMARY

In order to solve or at least partially solve the above technical problems, the embodiments of the present disclosure provide a network livestreaming method, a network livestreaming apparatus, and a computer-readable storage medium and an electronic device both for implementing the network livestreaming method.

In a first aspect, the embodiments of the present disclosure provide a network livestreaming method, comprising:
  receiving a plurality of livestreaming video streams, the plurality of livestreaming video streams belonging to the same livestreaming video, and each of the plurality of livestreaming video streams being one of a plurality of livestreaming video streams with different viewing angles that belong to the livestreaming video;
  displaying a first video livestreaming page, the first video livestreaming page comprising a first identifier and a first livestreaming room, the first livestreaming room playing a first video corresponding to a first livestreaming video stream, and the first livestreaming video stream being any one of the plurality of livestreaming video streams;
  in response to a first triggering operation for the first identifier, displaying a plurality of second identifiers on the first video livestreaming page, one second identifier of the plurality of second identifiers being correspondingly related to one livestreaming video stream of the plurality of livestreaming video streams; and
  in response to a second triggering operation for a target identifier, switching to a second livestreaming video stream corresponding to the target identifier to play a second video corresponding to the second livestreaming video stream in the first livestreaming room, where the target identifier is one of the plurality of second identifiers and the second livestreaming video stream is different from the first livestreaming video stream.

Alternatively, in some embodiments of the present disclosure, the method further comprises:
  acquiring a first attribute parameter of the first livestreaming video stream;
  acquiring a second attribute parameter of the second livestreaming video stream;
  if it is determined that the second attribute parameter is different from the first attribute parameter, updating a current first user interface of the first livestreaming room to a second user interface, where the second user interface is different from the first user interface and is related to the second livestreaming video stream; and
  playing the second video corresponding to the second livestreaming video stream in the first livestreaming room that is updated.

Alternatively, in some embodiments of the present disclosure, the first attribute parameter and the second attribute parameter comprise a video image ratio.

Alternatively, in some embodiments of the present disclosure, the method further comprises:
  displaying a third identifier on the first video livestreaming page;
  in response to a third triggering operation for the third identifier, displaying at least one preset livestreaming room identifier on the first video livestreaming page; and
  in response to a fourth triggering operation for a designated livestreaming room identifier, switching to a second video livestreaming page corresponding to the designated livestreaming room identifier, the second video livestreaming page comprising a second livestreaming room, the second livestreaming room playing a third video; where the designated livestreaming room identifier is any one of the at least one preset livestreaming room identifier, and the third video is related to the first video.

Alternatively, in some embodiments of the present disclosure, the in response to a third triggering operation for the third identifier, displaying at least one preset livestreaming room identifier on the first video livestreaming page comprises:
  acquiring video content information of the first video in response to the third triggering operation for the third identifier;
  determining, based on the video content information, at least one target livestreaming room related to the video content information from a set of livestreaming rooms, the set of livestreaming rooms comprising a plurality of livestreaming rooms that are broadcasting live;
  acquiring a livestreaming room identifier of the at least one target livestreaming room, and taking the livestreaming room identifier of the at least one target livestreaming room as the at least one preset livestreaming room identifier; and
  displaying the at least one preset livestreaming room identifier in a designated region on the first video livestreaming page.

Alternatively, in some embodiments of the present disclosure, the in response to a fourth triggering operation for a designated livestreaming room identifier, switching to a second video livestreaming page corresponding to the designated livestreaming room identifier comprises:

in response to the fourth triggering operation for the designated livestreaming room identifier, displaying a control for reminding to switch livestreaming pages, a first sub-control and a second sub-control being displayed on the control;

in response to detecting a fifth triggering operation for the first sub-control, switching to the second video livestreaming page corresponding to the designated livestreaming room identifier; and in response to detecting a sixth triggering operation for the second sub-control, skipping switching and still displaying the first video livestreaming page.

Alternatively, in some embodiments of the present disclosure, the method further comprises:

displaying a prompt message at a second identifier, corresponding to the first livestreaming video stream, among the plurality of second identifiers when displaying the plurality of second identifiers on the first video livestreaming page.

In a second aspect, the embodiments of the present disclosure provide a livestreaming method, comprising: receiving a plurality of livestreaming video streams, wherein the plurality of livestreaming video streams correspond to a plurality of different viewing angles of a same livestreaming video; displaying a first video livestreaming page corresponding to a first livestreaming room, wherein the first video livestreaming page displays a first identifier, the first livestreaming room plays a first video corresponding to a first livestreaming video stream, and the first livestreaming video stream is any one of the plurality of livestreaming video streams; in response to a first triggering operation for the first identifier, displaying a plurality of second identifiers on the first video livestreaming page, wherein the plurality of second identifiers correspond to the plurality of livestreaming video streams; and in response to a second triggering operation for a target identifier, switching to a second livestreaming video stream corresponding to the target identifier to play a second video corresponding to the second livestreaming video stream in the first livestreaming room, wherein the target identifier is one of the plurality of second identifiers.

Alternatively, in some embodiments of the present disclosure, the method further comprises: acquiring a first attribute parameter of the first livestreaming video stream; acquiring a second attribute parameter of the second livestreaming video stream; in response to determining that the second attribute parameter is different from the first attribute parameter, updating a first user interface currently displayed in the first livestreaming room to a second user interface, wherein the second user interface is different from the first user interface and is related to the second livestreaming video stream; and playing the second video corresponding to the second livestreaming video stream in the first livestreaming room that is updated.

Alternatively, in some embodiments of the present disclosure, the first attribute parameter and the second attribute parameter each comprises a video image ratio.

Alternatively, in some embodiments of the present disclosure, the method further comprises: displaying a third identifier on the first video livestreaming page; in response to a third triggering operation for the third identifier, displaying at least one preset livestreaming room identifier on the first video livestreaming page; and in response to a fourth triggering operation for a designated livestreaming room identifier, switching to a second video livestreaming page corresponding to the designated livestreaming room identifier, the second video livestreaming page displaying a second livestreaming room, the second livestreaming room playing a third video; wherein the designated livestreaming room identifier is any one of the at least one preset livestreaming room identifier, and the third video is related to the first video.

Alternatively, in some embodiments of the present disclosure, the in response to a third triggering operation for the third identifier, displaying at least one preset livestreaming room identifier on the first video livestreaming page comprises: acquiring video content information of the first video in response to the third triggering operation for the third identifier; determining, based on the video content information, at least one target livestreaming room related to the video content information from a set of livestreaming rooms, the set of livestreaming rooms comprising a plurality of livestreaming rooms that are broadcasting live; acquiring at least one livestreaming room identifier respectively corresponding to the at least one target livestreaming room, and taking the at least one livestreaming room identifier respectively corresponding to the at least one target livestreaming room as the at least one preset livestreaming room identifier; and displaying the at least one preset livestreaming room identifier in a designated region on the first video livestreaming page.

Alternatively, in some embodiments of the present disclosure, the in response to a fourth triggering operation for a designated livestreaming room identifier, switching to a second video livestreaming page corresponding to the designated livestreaming room identifier comprises: in response to the fourth triggering operation for the designated livestreaming room identifier, displaying a control for reminding to switch livestreaming pages, wherein the control comprises a first sub-control and a second sub-control; in response to detecting a fifth triggering operation for the first sub-control, switching to the second video livestreaming page corresponding to the designated livestreaming room identifier; and in response to detecting a sixth triggering operation for the second sub-control, skipping switching and still displaying the first video livestreaming page.

Alternatively, in some embodiments of the present disclosure, the method further comprises: displaying a prompt message at a second identifier, corresponding to the first livestreaming video stream, among the plurality of second identifiers when displaying the plurality of second identifiers on the first video livestreaming page.

Alternatively, in some embodiments of the present disclosure, the second livestreaming video stream is different from the first livestreaming video stream.

In a third aspect, the embodiments of the present disclosure provide a network livestreaming apparatus, comprising:

a data receiving module, configured to receive a plurality of livestreaming video streams, the plurality of livestreaming video streams belonging to the same livestreaming video, and each of the plurality of livestreaming video streams being one of a plurality of livestreaming video streams with different viewing angles that belong to the livestreaming video;

a first display module, configured to display a first video livestreaming page, the first video livestreaming page comprising a first identifier and a first livestreaming room, the first livestreaming room playing a first video corresponding to a first livestreaming video stream, and the first livestreaming video stream being any one of the plurality of livestreaming video streams;

a second display module, configured to, in response to a first triggering operation for the first identifier, display a plurality of second identifiers on the first video livestreaming page, one second identifier of the plurality of second identifiers being correspondingly related to one livestreaming video stream of the plurality of livestreaming video streams; and a livestreaming processing module, configured to, in response to a second triggering operation for a target identifier, switch to a second livestreaming video stream corresponding to the target identifier to play a second video corresponding to the second livestreaming video stream in the first livestreaming room, where the target identifier is one of the plurality of second identifiers and the second livestreaming video stream is different from the first livestreaming video stream.

In a fourth aspect, the embodiments of the present disclosure provide a non-transitory computer-readable storage medium, having a computer program stored thereon, the computer program, when executed by a processor, implements steps of the network livestreaming method described in any one of the above embodiments.

In a fifth aspect, the embodiments of the present disclosure provide an electronic device, comprising:
  a processor; and
  a memory, used to store a computer program;
  the processor is configured to execute the computer program to perform steps of the network livestreaming method described in any one of the above embodiments.

Compared with the prior art, the technical solution provided by the embodiments of the present disclosure has the following advantages:

in the network livestreaming method and apparatus, a medium, and an electronic device provided by the embodiments of the present disclosure, a plurality of livestreaming video streams are received, the plurality of livestreaming video streams belong to the same livestreaming video and correspond to a plurality of different viewing angles of the livestreaming video one-by-one, and each of the plurality of livestreaming video streams is one of a plurality of livestreaming video streams with different viewing angles that belong to the livestreaming video; a first video livestreaming page is displayed, the first video livestreaming page comprises a first identifier and a first livestreaming room, the first livestreaming room plays a first video corresponding to a first livestreaming video stream, and the first livestreaming video stream is any one of the plurality of livestreaming video streams; in response to a first triggering operation for the first identifier, a plurality of second identifiers are displayed on the first video livestreaming page, one second identifier of the plurality of second identifiers is correspondingly related to one livestreaming video stream of the plurality of livestreaming video streams; and in response to a second triggering operation for a target identifier, switching to a second livestreaming video stream corresponding to the target identifier to play a second video corresponding to the second livestreaming video stream in the first livestreaming room, and the target identifier is one of the plurality of second identifiers and the second livestreaming video stream is different from the first livestreaming video stream.

BRIEF DESCRIPTION OF THE DRAWINGS

The accompanying drawings herein are incorporated into and constitute a part of the specification, show the embodiments consistent with the present disclosure, and together with the specification, serve to explain the principles of the present disclosure.

In order to more clearly illustrate the technical solutions of the embodiments of the present disclosure or the prior art, the drawings required for describing the embodiments or the prior art will be briefly described in the following; it is obvious that those skilled in the art can obtain other drawing(s) according to these drawings, without any inventive work.

DETAILED DESCRIPTION

In order to understand the above objects, features, and advantages of the present disclosure more clearly, the technical solutions of the present disclosure will be further described below. It should be noted that, in case of no conflict, the embodiments of the present disclosure and the features in the embodiments can be combined with each other.

In the following description, many specific details are set forth in order to fully understand the present disclosure, but the present disclosure may be implemented in other ways than those described herein; apparently, the embodiments in the specification are just a part but not all of the embodiments of the present disclosure.

It should be understood that, in the following, the term "at least one" refers to one or more, and the term "a plurality of" refers to two or more. "and/or" is used for describing an associated relationship of associated objects, indicating that three relationships may be present. For example, "A and/or B" may indicate three cases: presence of only A; presence of only B; and presence of both A and B, and A and B may be singular or plural. The character "/" herein generally indicates that previous and next associated objects have an "or" relationship. "at least one of the following", or similar expressions, refers to any combination of these items, including any combination of single (one) item or a plurality of items. For example, at least one of a, b, or c, may indicate: a, b, c, "a and b," "a and c," "b and c," or "a, b, and c," where a, b, and c may be single or multiple.

It should be understood that, in the following, "room" can represent the "channel", that is, in the present disclosure, "room" and "channel" have the similar meaning. For example, in the present disclosure, "identifier" can be embodied as an "icon" on the page.

Figure 1A:
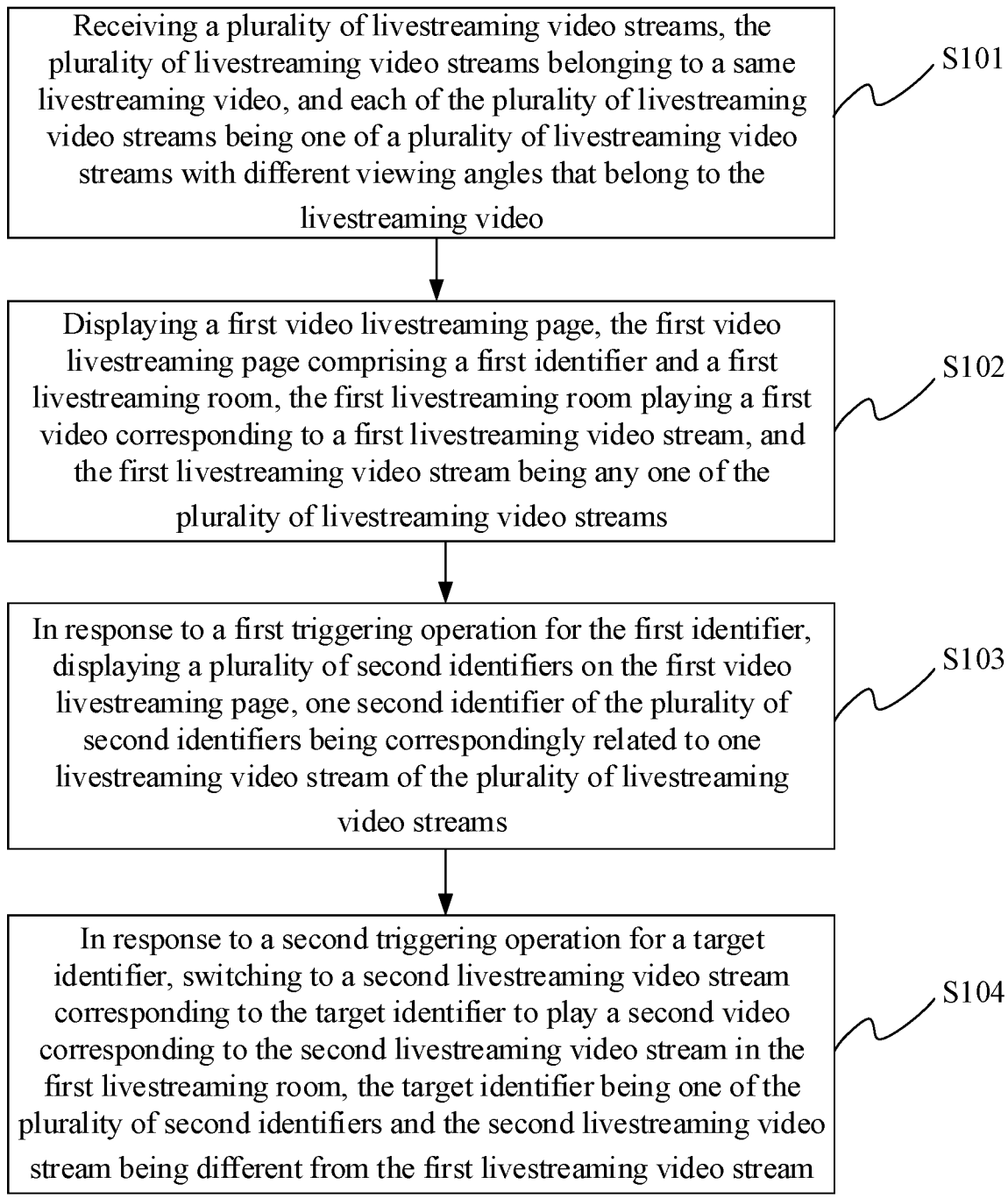
FIG. 1A is a flowchart of a network livestreaming method according to an embodiment of the present disclosure.
Figure 1B:
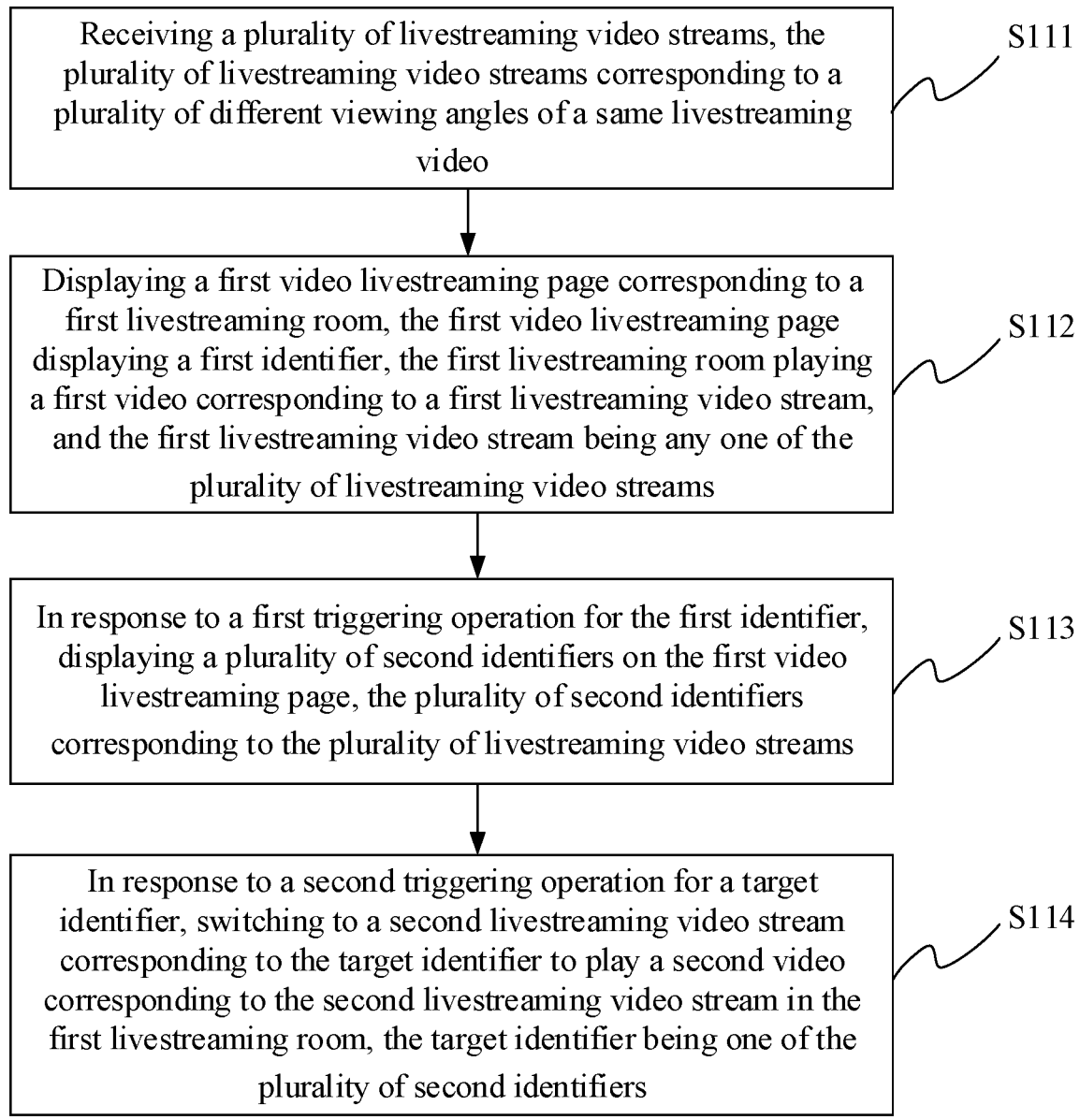
FIG. 1B is a flowchart of a livestreaming method according to an embodiment of the present disclosure.

FIG. 1A is a flowchart of a network livestreaming method according to an embodiment of the present disclosure, FIG. 1B is a flowchart of a livestreaming method according to an embodiment of the present disclosure. The method may be applied to a mobile terminal such as a smartphone and a notebook computer, in an example, as shown in FIG. 1A, the method may specifically include the steps S101-S104 as below; in another example, as shown in FIG. 1B, the method may specifically include the steps S111-S114 as below.

As shown in FIG. 1A, Step S101: receiving a plurality of livestreaming video streams, the plurality of livestreaming video streams belonging to a same livestreaming video, and each of the plurality of livestreaming video streams being one of a plurality of livestreaming video streams with different viewing angles that belong to the livestreaming video.

As shown in FIG. 1B, Step S111: receiving a plurality of livestreaming video streams, the plurality of livestreaming video streams corresponding to a plurality of different viewing angles of a same livestreaming video.

In one example, the mobile terminal such as a smartphone may send a livestreaming watch request to a server. For example, a user starts a target application installed on the smartphone, performs an input operation in a user interface of the target application to generate the livestreaming watch request, the target application then sends the livestreaming watch request to the server, and receives a plurality of livestreaming video streams returned by the server in response to the livestreaming watch request. The plurality of livestreaming video streams belong to the same livestreaming video, such as a livestreaming video of a party. The target application may be a video application, an instant messaging application, or an e-commerce application, etc., which is not limited thereto.

In one example, the plurality of livestreaming video streams correspond to the plurality of different viewing angles of the same livestreaming video one by one.

Specifically, a plurality of cameras at different positions may be set up on the party scene, and the plurality of cameras capture the party scene from different angles to form a plurality of livestreaming video streams with different viewing angles. The plurality of livestreaming video streams with different viewing angles are transmitted to the server, e.g., but not limited to, by means of the Internet.

As shown in FIG. 1A, Step S102: displaying a first video livestreaming page, the first video livestreaming page comprising a first identifier and a first livestreaming room, the first livestreaming room playing a first video corresponding to a first livestreaming video stream, and the first livestreaming video stream being any one of the plurality of livestreaming video streams.

As shown in FIG. 1B, Step S112: displaying a first video livestreaming page corresponding to a first livestreaming room, the first video livestreaming page displaying a first identifier, the first livestreaming room playing a first video corresponding to a first livestreaming video stream, and the first livestreaming video stream being any one of the plurality of livestreaming video streams.

Figure 2:
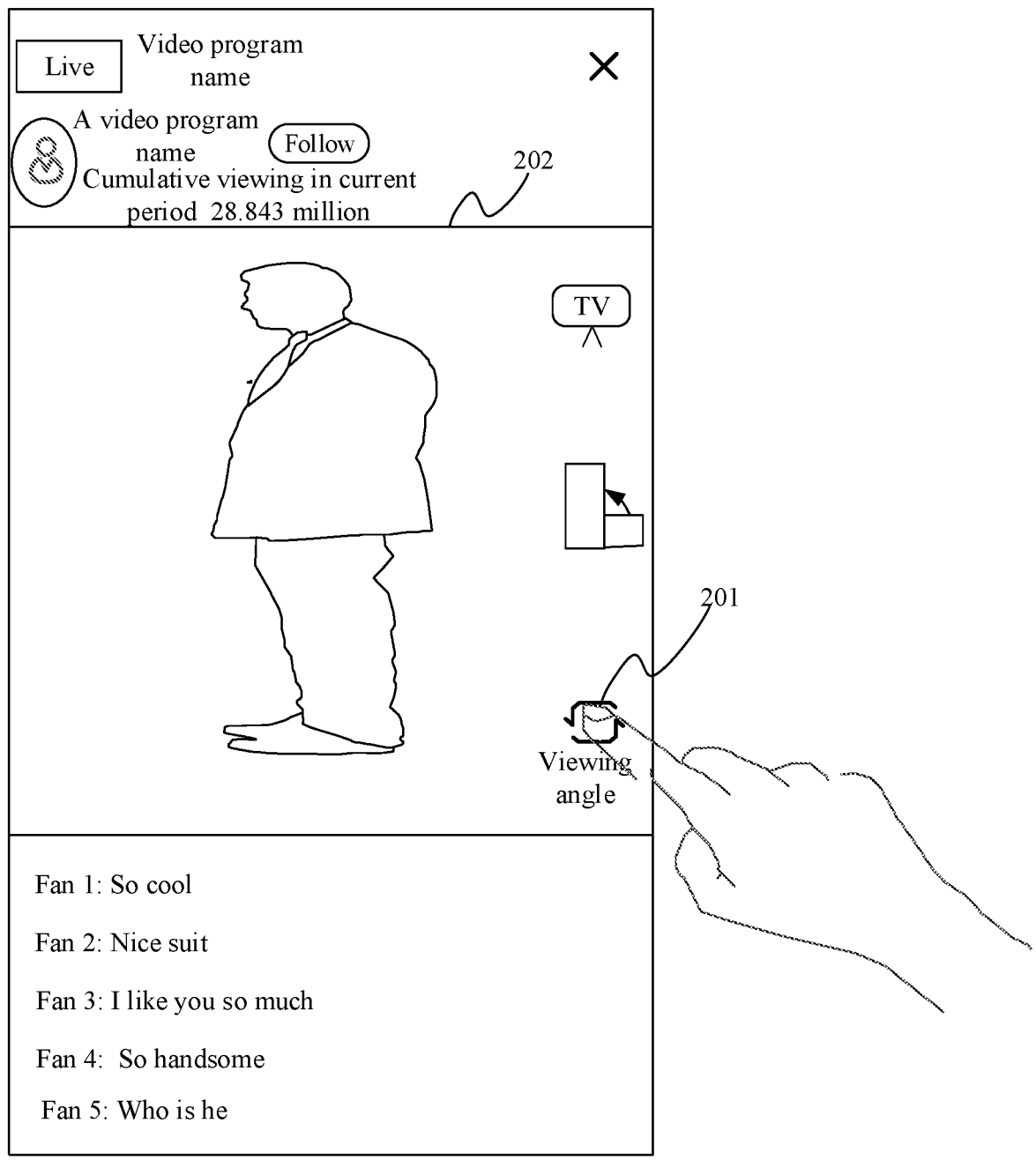
FIG. 2 is a schematic diagram of a first video livestreaming page according to an embodiment of the present disclosure.

Specifically, referring to FIG. 2, a first identifier 201 and a first livestreaming room 202 are displayed on the first video livestreaming page. The first identifier 201 may be a virtual icon "Viewing angle", and the first video corresponding to the first livestreaming video stream is played in a window of the first livestreaming room 202. The first livestreaming video stream may be, for example, a livestreaming video stream corresponding to a main viewing angle among the above-mentioned plurality of livestreaming video streams with different viewing angles.

As shown in FIG. 1A, Step S103: in response to a first triggering operation for the first identifier, displaying a plurality of second identifiers on the first video livestreaming page, one second identifier of the plurality of second identifiers being correspondingly related to one livestreaming video stream of the plurality of livestreaming video streams.

As shown in FIG. 1B, Step S113: in response to a first triggering operation for the first identifier, displaying a plurality of second identifiers on the first video livestreaming page, the plurality of second identifiers corresponding to the plurality of livestreaming video streams.

In one example, the plurality of second identifiers correspond to the plurality of livestreaming video streams one by one.

Figure 3:
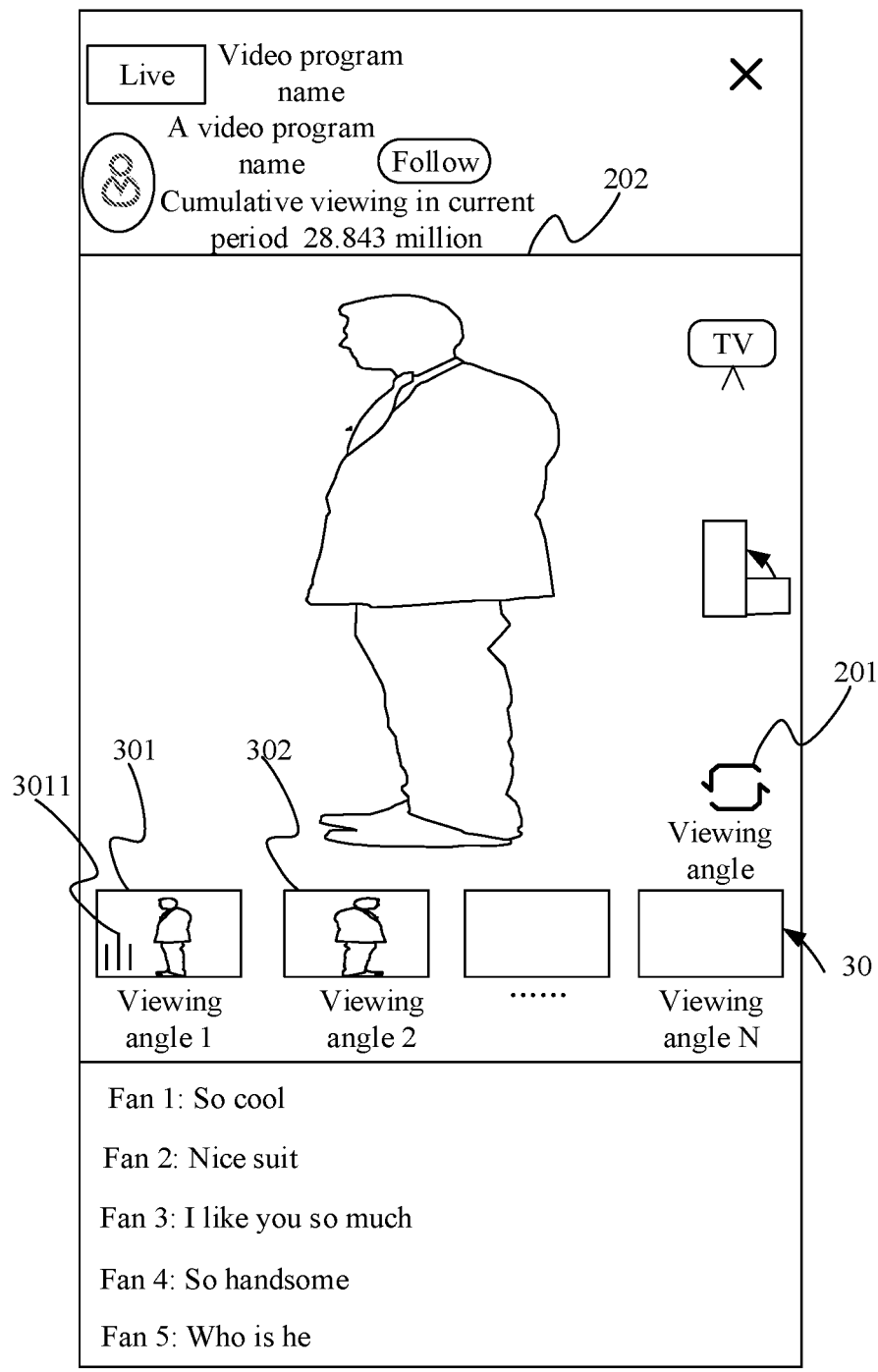
FIG. 3 is another schematic diagram of a first video livestreaming page according to an embodiment of the present disclosure.

Illustratively, the first triggering operation may be a touch operation or a click operation. As shown in FIGS. 2 and 3, the smartphone displays a plurality of second identifiers 30 on the first video livestreaming page in response to the user clicking on the first identifier 201, such as the virtual icon "Viewing angle", on the first video livestreaming page. The plurality of second identifiers 30 may be a viewing angle identifier 301, a viewing angle identifier 302, etc., namely, Viewing angle 1, Viewing angle 2, . . . , and Viewing angle N. The viewing angle identifiers such as Viewing angle 1, Viewing angle 2 to Viewing angle N correspond one by one to the above-mentioned plurality of livestreaming video streams with different viewing angles. The following Table 1 schematically shows a corresponding relationship between the plurality of second identifiers, such as viewing angle identifiers, and the plurality of livestreaming video streams corresponding to the viewing angles, but the present disclosure is not limited thereto.

TABLE 1

| Second identifier (Viewing angle identifier) | Livestreaming video stream |
| --- | --- |
| Viewing angle 1 | Livestreaming video stream 1 |
| Viewing angle 2 | Livestreaming video stream 2 |
| . . . | . . . |
| Viewing angle N | Livestreaming video stream N |

As shown in FIG. 1A, Step S104: in response to a second triggering operation for a target identifier, switching to a second livestreaming video stream corresponding to the target identifier to play a second video corresponding to the second livestreaming video stream in the first livestreaming room, the target identifier being one of the plurality of second identifiers and the second livestreaming video stream being different from the first livestreaming video stream.

As shown in FIG. 1B, Step S114: in response to a second triggering operation for a target identifier, switching to a second livestreaming video stream corresponding to the target identifier to play a second video corresponding to the second livestreaming video stream in the first livestreaming room, the target identifier being one of the plurality of second identifiers.

Figure 4:
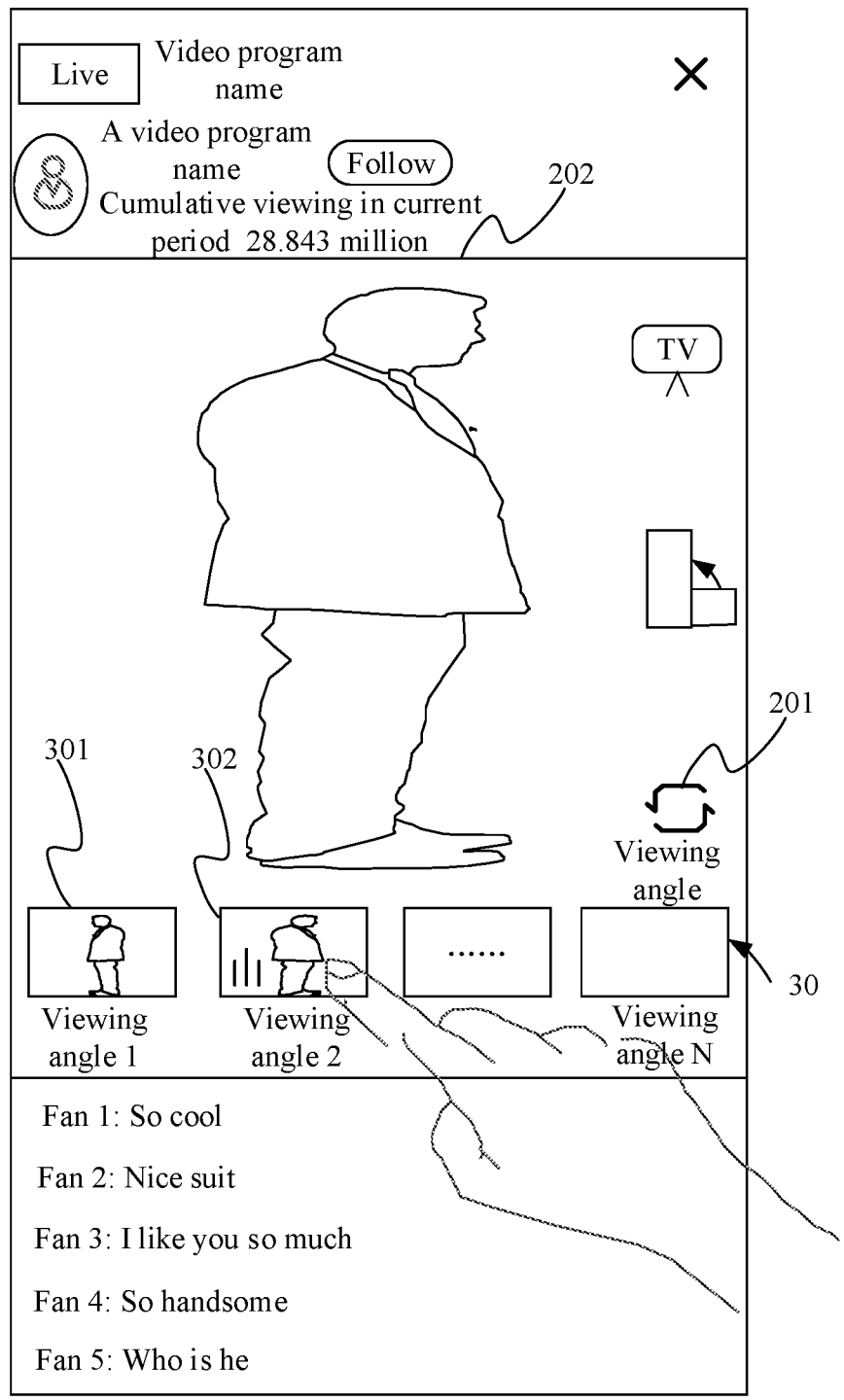
FIG. 4 is yet another schematic diagram of a first video livestreaming page according to an embodiment of the present disclosure.

Illustratively, the target identifier may be one of the plurality of second identifiers 30, i.e., the viewing angle identifiers. The target identifier in this embodiment is, for example, any one viewing angle identifier, such as the viewing angle identifier 302, i.e., "Viewing angle 2", of the plurality of viewing angle identifiers other than the viewing angle identifier 301, i.e., "Viewing angle 1", corresponding to the first livestreaming video stream, i.e., the livestreaming video stream of the main viewing angle. The second triggering operation may be a touch operation or a click operation. As shown in FIG. 4, the smartphone switches to the second livestreaming video stream corresponding to "Viewing angle 2" in response to the user clicking on the target identifier such as "Viewing angle 2" on the first video livestreaming page, thus implementing to switch to play the second video corresponding to the second livestreaming video stream in the first livestreaming room 202, i.e., switching from a video image of one viewing angle to a video image of another viewing angle, for example, switching from a video image of a main stage in the party to a close-up video image of a certain audience at the auditorium below the stage. The user can of course choose other viewing angle identifiers by clicking according to personal needs.

In the network livestreaming method provided by the embodiments of the present disclosure, the user chooses to switch livestreaming video images with different viewing angles of the current livestreaming video by clicking on the target identifier among the plurality of second identifiers 30 on the first video livestreaming page, so that the livestreaming video images of different viewing angles can be conveniently and quickly switched to meet the requirements of professional live media content, for example, quickly switching from a livestreaming video image of one viewing angle to a livestreaming video image of another viewing angle. The user can choose to switch to a livestreaming video image of a certain viewing angle to watch according to personal needs, so that personalized needs are satisfied and the user's viewing experience is improved.

Optionally, in some embodiments of the present disclosure, with reference to FIG. 3, the method may further include the following step: displaying a prompt message 3011 at a second identifier, that is, the viewing angle identifier 301, corresponding to the first livestreaming video stream, among the plurality of second identifiers 30 when displaying the plurality of second identifiers 30 on the first video livestreaming page.

Illustratively, the prompt message 3011 may be a dynamic graphic for prompting that the first livestreaming room 202 currently displays a video image of a livestreaming video stream 1 corresponding to Viewing angle 1. Specifically, when displaying the plurality of second identifiers 30 such as the viewing angle identifier 301 or 302, a thumbnail of the corresponding video cover may be displayed. Such a prompt may facilitate the user to accurately determine that the video image corresponding to which viewing angle is currently being played in the first livestreaming room 202, thereby facilitating the selection and switching of livestreaming video images of different viewing angles.

In some cases, in order to more comprehensively display the livestreaming media content, professional live media need livestreaming of multiple viewing angles. A plurality of cameras at different positions set on the party scene are used to capture the party scene from different angles, so that a plurality of livestreaming video streams with different viewing angles are formed. A video image corresponding to one livestreaming video stream may be a vertical-screen display image when displaying, while a video image corresponding to another livestreaming video stream may be a horizontal-screen display image when displaying. In this situation, when switching from the livestreaming video image of one viewing angle to the livestreaming video image of another viewing angle, currently, only the livestreaming video streams are switched, the user interface of the livestreaming room remains unchanged, which results in an uncoordinated display of the interface after switching and leads to a poor display effect, making it difficult to satisfy the requirements of the professional live media content, and affecting the viewing experience of the user.

Figure 5:
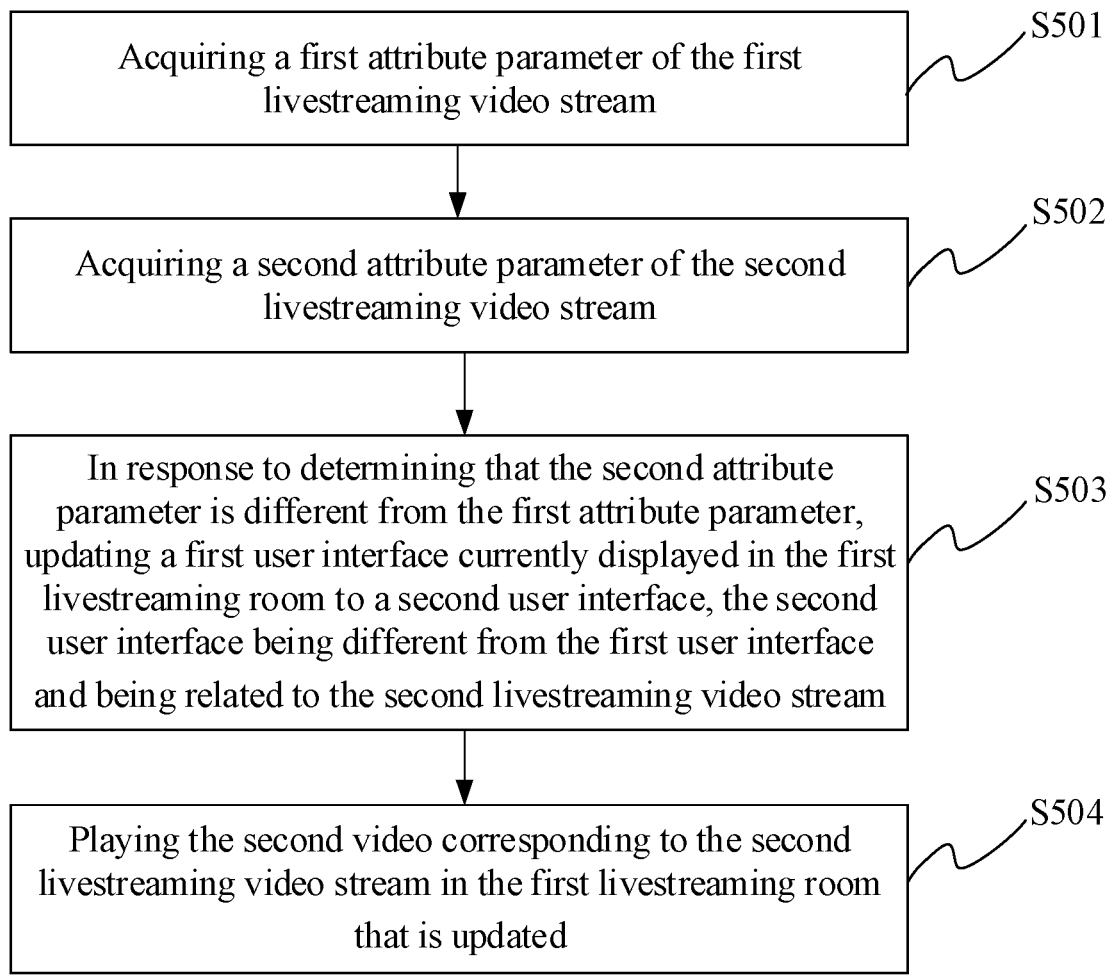
FIG. 5 is a flowchart of a network livestreaming method according to another embodiment of the present disclosure.

Therefore, on the basis of the above embodiments, in some embodiments of the present disclosure, with reference to the illustration in FIG. 5, the method may further include the following steps.

Step S501: acquiring a first attribute parameter of the first livestreaming video stream.

Illustratively, each of the above livestreaming video streams transmitted by the server to the smartphone may carry an attribute parameter of the livestreaming video stream, such as, but not limited to, a video image ratio when the livestreaming video stream is played.

Step S502: acquiring a second attribute parameter of the second livestreaming video stream.

Specifically, the smartphone may acquire a first video image ratio corresponding to the first livestreaming video stream, and may also acquire a second video image ratio corresponding to the second livestreaming video stream.

It is to be understood that as long as steps S501-S502 may be performed before switching to the second livestreaming video stream corresponding to the target identifier in step S104.

Step S503: in response to determining that the second attribute parameter is different from the first attribute parameter, updating a first user interface currently displayed in the first livestreaming room to a second user interface, the second user interface being different from the first user interface and being related to the second livestreaming video stream.

In one example, the first video image ratio, i.e., a ratio of the length to the width of a display image, corresponding to the first livestreaming video stream is 16:9, namely, a horizontal image, while the second video image ratio, i.e., a ratio of the length to the width of the display image, corresponding to the second livestreaming video stream is 9:16, namely, a vertical-screen image. The first user interface is related to the first video image ratio, e.g., is related to the horizontal-screen display image, and the layout position of elements on the first user interface is adapted to the display requirements of the vertical-screen image. The second user interface is matched to the second livestreaming video stream, for example, the layout position of elements on the second user interface is adapted to display requirements of the vertical-screen image. Elements on the user interface may include various virtual buttons (e.g., a TV screen-mirroring button, and a screen automatic rotation button) and text, etc., and the layout position of the elements includes, for example, a display position of the virtual buttons, and a display region of the text, such as the position of a bullet-screen interactive region.

Before switching to the second livestreaming video stream corresponding to the target identifier in step S104, when it is determined that the first video image ratio corresponding to the first livestreaming video stream is different from the second video image ratio corresponding to the second livestreaming video stream, the current first user interface UI (User Interface) of the first livestreaming room is updated to the second user interface so as to adapt to the display requirements for the vertical-screen image, and at the same time, switching to the second livestreaming video stream corresponding to the target identifier is performed.

Step S504: playing the second video corresponding to the second livestreaming video stream in the first livestreaming room that is updated.

Specifically, after switching to the second livestreaming video stream corresponding to the target identifier, the second video corresponding to the second livestreaming video stream is played in the updated second user interface, that is, displaying in the vertical-screen mode.

In the above solution in this embodiment, when switching from a livestreaming video image of one viewing angle to a livestreaming video image of another viewing angle, the user interface of the livestreaming room is updated adaptively while switching the livestreaming video streams, so that the switched interface has good display coordination and a good display effect, thus improving the viewing experience of the user.

Figure 6:
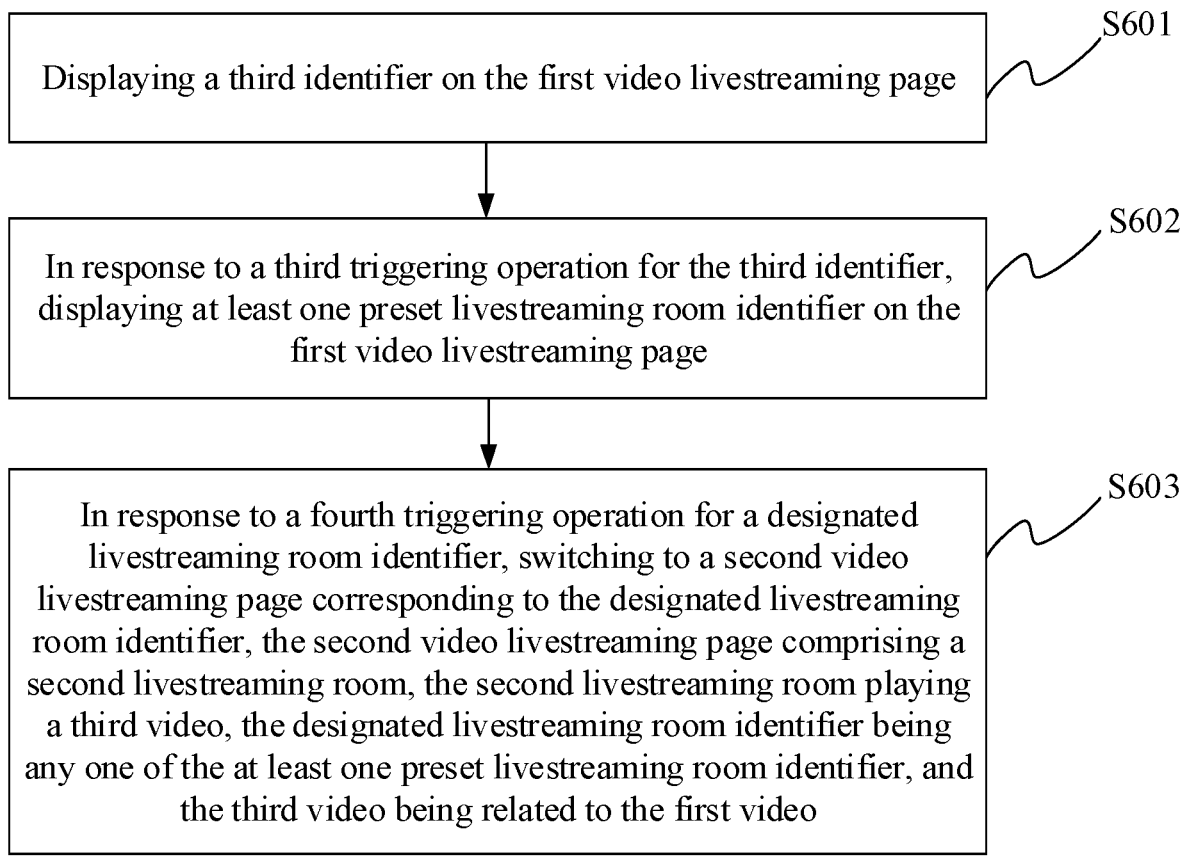
FIG. 6 is a flowchart of a network livestreaming method according to yet another embodiment of the present disclosure.

Optionally, on the basis of any of the above embodiments, with reference to the illustration in FIG. 6, in some embodiments of the present disclosure, the method may further include the following steps.

Step S601: displaying a third identifier on the first video livestreaming page.

Figure 7:
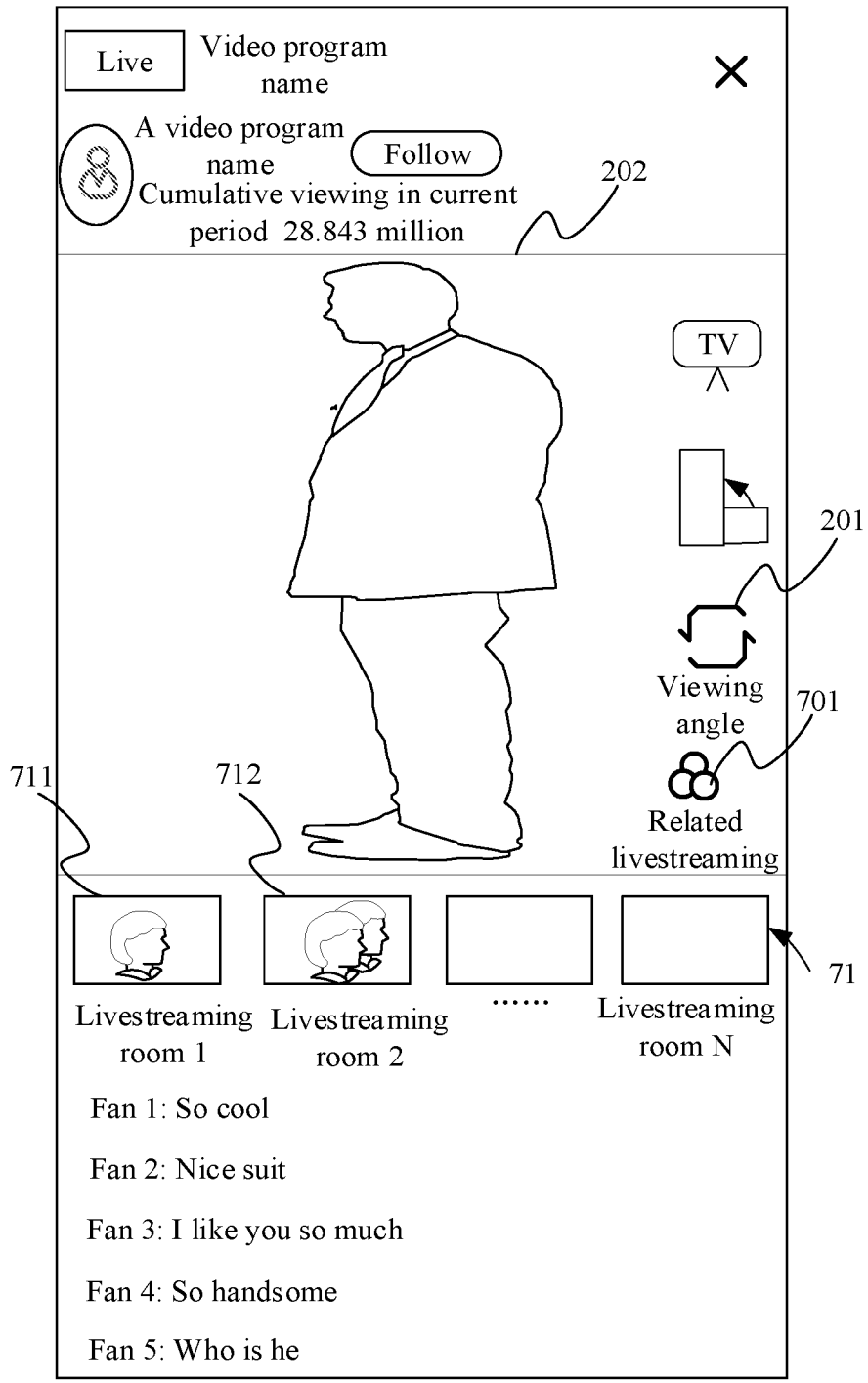
FIG. 7 is still another schematic diagram of a first video livestreaming page according to an embodiment of the present disclosure.

Illustratively, as shown in FIG. 7, a third identifier 701 may be a display button of the livestreaming room identifier, such as a button "Related livestreaming". When the user enters the first video livestreaming page, the third identifier 701, such as the button "Related livestreaming", may be displayed on the first video livestreaming page.

Step S602: in response to a third triggering operation for the third identifier, displaying at least one preset livestreaming room identifier on the first video livestreaming page.

Illustratively, the third triggering operation may be a touch operation or a click operation, and the preset livestreaming room identifier may be a livestreaming room name or a live streamer name, which is not limited thereto. If the user clicks on the third identifier 701 such as the button "Related livestreaming" on the first video livestreaming page, one or more preset livestreaming room identifiers 71, such as the livestreaming room names, is triggered to be unfold and displayed. For example, the livestreaming room name 711, i.e., "Livestreaming room 1", the livestreaming room name 712, i.e., "Livestreaming room 2", the livestreaming room name such as "Livestreaming room N", and the like are displayed.

Step S603: in response to a fourth triggering operation for a designated livestreaming room identifier, switching to a second video livestreaming page corresponding to the designated livestreaming room identifier, the second video livestreaming page displaying a second livestreaming room, the second livestreaming room playing a third video, the designated livestreaming room identifier being any one of the at least one preset livestreaming room identifier, and the third video being related to the first video.

Figure 8:
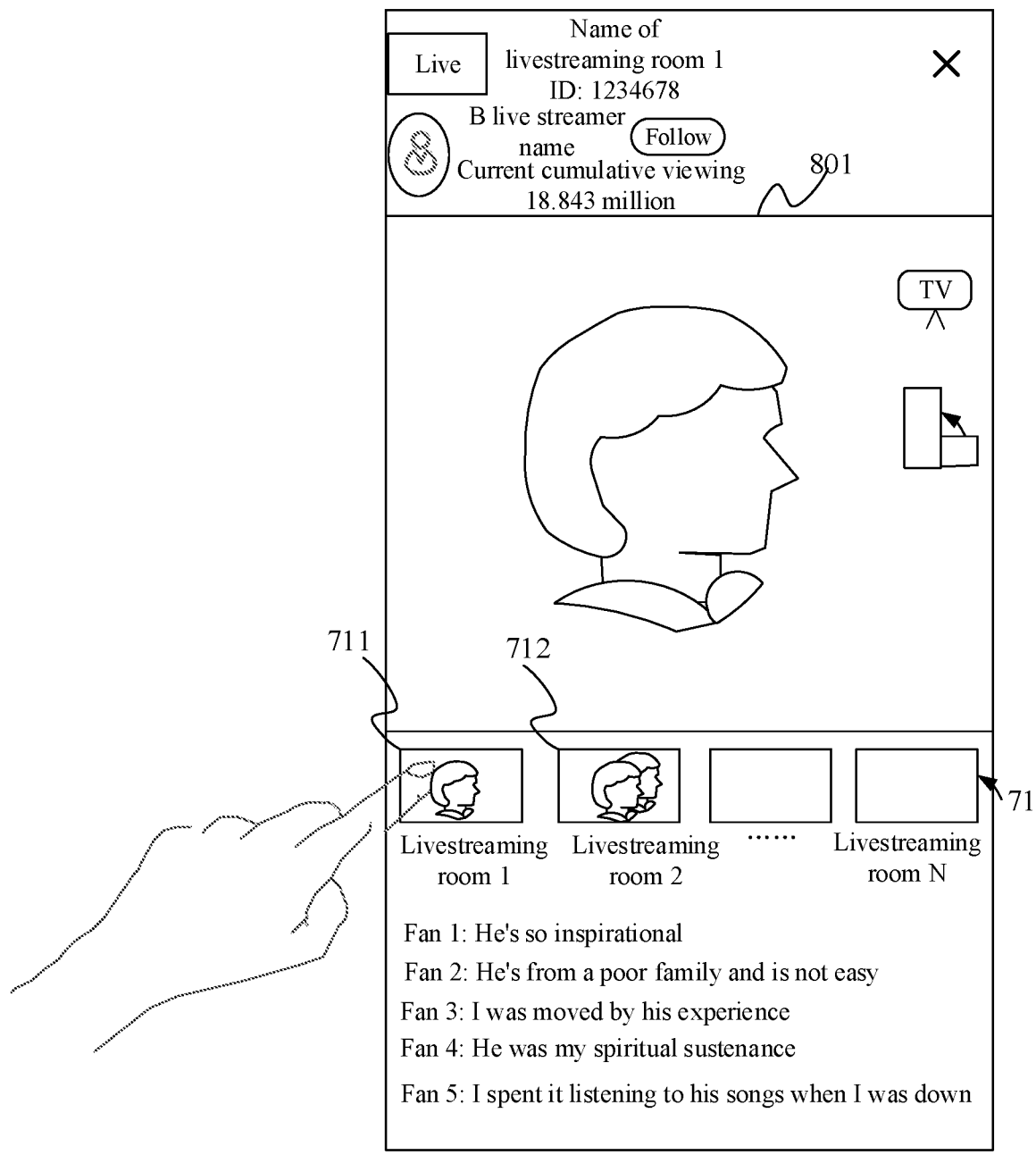
FIG. 8 is a schematic diagram of a second video livestreaming page according to an embodiment of the present disclosure.

Illustratively, the designated livestreaming room identifier such as a designated livestreaming room name is any one of the plurality of preset livestreaming room identifiers, such as the livestreaming room names, which are displayed. For example, the designated livestreaming room identifier is the designated livestreaming room name 711, i.e., "Livestreaming room 1". The fourth triggering operation may be a touch operation, a click operation, or the like. If the user clicks on the designated livestreaming room name 711, i.e., "Livestreaming room 1", among the plurality of preset livestreaming room names displayed in the first video livestreaming page, the page is switched to the second video livestreaming page corresponding to "Livestreaming room 1", for example, switching is performed based on the unique ID of the livestreaming room. As shown in FIG. 8, the second video livestreaming page includes a second livestreaming room 801 corresponding to "Livestreaming room 1", and the second livestreaming room 801 plays other videos related to the first video.

For example, if the first video played in the first livestreaming room 202 is a video about a singer's concert, the second livestreaming room 801 indicated by the preset livestreaming room identifier plays a livestreaming video about the performance experience and the growth experience of the singer, and the like, that is, a derivative video content or a peripheral video content related to the first video.

According to the above technical solution in this embodiment, the user can simply and conveniently operate such as clicking and jumping to another associated livestreaming room to watch the derivative video content or peripheral video content when watching the livestreaming video in a livestreaming room, so that the interaction with the secondary creation video content is implemented, thus further satisfying personalized needs of the user and improving the viewing experience of the user.

Optionally, in some embodiments of the present disclosure, in the step S602, in response to a third triggering operation for the third identifier, displaying at least one preset livestreaming room identifier on the first video livestreaming page may specifically include the steps as below.

Step a): acquiring video content information of the first video in response to the third triggering operation for the third identifier.

Specifically, if the user clicks on the third identifier 701, such as the button "Related livestreaming", on the first video livestreaming page, the video content information of the first video that is played currently in the first livestreaming room 202 is obtained, the video content information is, such as, text corresponding to voice in the video, but the present disclosure is not limited thereto, the video content information may also be the name of the video, advertisement information in the video, and the like.

Step b): determining, based on the video content information, at least one target livestreaming room related to the video content information from a set of livestreaming rooms, the set of livestreaming rooms comprising a plurality of livestreaming rooms that are broadcasting live.

Illustratively, the set of livestreaming rooms may include a plurality of livestreaming rooms that are broadcasting live, such as a livestreaming room A, a livestreaming room B, a livestreaming room C, a livestreaming room D, and the like, which are broadcasting live, and specifically, the IDs of the livestreaming rooms may be used as elements in the set of livestreaming rooms. After the video content information of the first video is acquired, the video content information of, for example, the livestreaming room A, the livestreaming room B, the livestreaming room C, and the livestreaming room D may be obtained based on the IDs of the livestreaming rooms, and then the video content information of the first video is matched with the video content information of any one of the livestreaming room A, the livestreaming room B, the livestreaming room C, and the livestreaming room D separately to determine the correlation between the video content information of the first video and the video content information of any one of the livestreaming room A, the livestreaming room B, the livestreaming room C, and the livestreaming room D. The livestreaming room with a large degree of correlation is selected as a target livestreaming room. For example, it is determined that the livestreaming room B, the livestreaming room C, and the livestreaming room D are the target livestreaming rooms, while the livestreaming room A is not the target livestreaming room, that is, what is played in the livestreaming room B, the livestreaming room C, and the livestreaming room D is the video content, such as the derivative video content or peripheral video content, that is related to the video currently played in the first livestreaming room, and what is played in the livestreaming room A is not related to the video currently played in the first livestreaming room.

Step c): acquiring at least one livestreaming room identifier respectively corresponding to the at least one target livestreaming room, and taking the at least one livestreaming room identifier respectively corresponding to the at least one target livestreaming room as the at least one preset livestreaming room identifier.

Illustratively, after it is determined that, for example, the livestreaming room B, the livestreaming room C, and the livestreaming room D are the target livestreaming rooms, livestreaming room identifiers, such as livestreaming room names and/or IDs, or the like, of the livestreaming room B, the livestreaming room C, and the livestreaming room D are obtained. The respective livestreaming room identifiers respectively corresponding to the livestreaming room B, the livestreaming room C, and the livestreaming room D are then used as three preset livestreaming room identifiers.

Step d): displaying the at least one preset livestreaming room identifier in a designated region on the first video livestreaming page.

Illustratively, after the three preset livestreaming room identifiers are determined, the three preset livestreaming room identifiers, i.e., the respective livestreaming room identifiers, such as the livestreaming room names, respectively corresponding to the livestreaming room B, the livestreaming room C, and the livestreaming room D, can be displayed in a designated region on the first video livestreaming page. The designated region may be the bottom of the window of the first livestreaming room, but the present disclosure is not limited thereto.

According to the above technical solutions of the embodiments of the present disclosure, the target livestreaming room related to the first video is determined based on the video content information of the first video instead of arbitrarily selecting the target livestreaming room; and then the livestreaming room identifier of the target livestreaming room, i.e., the preset livestreaming room identifier, is displayed for the user, so that the user can select to jump to the livestreaming room playing the relevant derivative video content or peripheral video content to watch; in this way, the derivative video content or the peripheral video content may be accurately provided for the user to watch, thereby avoiding irrelevant video content, thus improving the viewing experience of the user.

Optionally, in some embodiments of the present disclosure, in the step S603, in response to a fourth triggering operation for a designated livestreaming room identifier, switching to a second video livestreaming page corresponding to the designated livestreaming room identifier includes the following steps.

Step i): in response to the fourth triggering operation for the designated livestreaming room identifier, displaying a control for reminding to switch livestreaming pages, the control comprising a first sub-control and a second sub-control.

Illustratively, the control for reminding to switch livestreaming pages may be, but is not limited to, a pop-up window, a text such as "Are you sure to switch the livestreaming room?" can be displayed in the pop-up window. The first sub-control may be a virtual button "Yes" displayed below the text in the pop-up window, and the second sub-control may be a virtual button "No" displayed below the text in the pop-up window.

Specifically, if the user clicks on the designed livestreaming room name 712, i.e., "Livestreaming room 1", among the plurality of preset livestreaming room names displayed on the first video livestreaming page, the displaying of the above pop-up window can be triggered (not shown).

Step ii): in response to detecting a fifth triggering operation for the first sub-control, switching to the second video livestreaming page corresponding to the designated livestreaming room identifier.

Specifically, the fifth triggering operation may be a click operation. When it is detected that the user clicks on the virtual button "Yes", the current page is switched to the second video livestreaming page corresponding to the "Livestreaming room 1", that is, switched to another related livestreaming room.

Step iii): in response to detecting a sixth triggering operation for the second sub-control, skipping switching and still displaying the first video livestreaming page.

Specifically, when it is detected that the user clicks on the virtual button "No", the first video livestreaming page is still displayed without switching, that is, remaining in the current first livestreaming room without performing the switching operation between livestreaming rooms.

It should be noted that, although the steps of the method in the present disclosure are described in a particular order in the drawings, it is not required or implied that the steps must be performed in such particular order, or that all these illustrated steps must be performed to achieve the desired results. Additionally or alternatively, some steps may be omitted, several steps may be combined into one step for execution, and/or one step may be decomposed into a plurality of steps for execution, and the like. Furthermore, it is also easy to understand that these steps may be performed, for example, synchronously or asynchronously in a plurality of modules/processes/threads.

Figure 9:
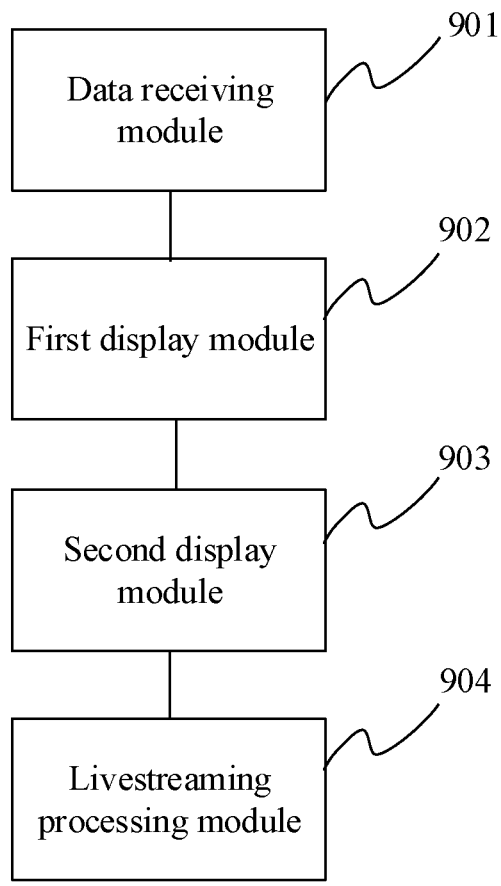
FIG. 9 is a schematic diagram of a network livestreaming apparatus according to an embodiment of the present disclosure.

An embodiment of the present disclosure further provides a network livestreaming apparatus. As shown in FIG. 9, the network livestreaming apparatus may include a data receiving module 901, a first display module 902, a second display module 903, and a livestreaming processing module 904.

In an example, the data receiving module 901 is configured to receive a plurality of livestreaming video streams, the plurality of livestreaming video streams belonging to a same livestreaming video and corresponding to different viewing angles of the livestreaming video one-by-one, and each of the plurality of livestreaming video streams being one of a plurality of livestreaming video streams with different viewing angles that belong to the livestreaming video. In another example, the data receiving module 901 is configured to receive a plurality of livestreaming video streams, and the plurality of livestreaming video streams correspond to a plurality of different viewing angles of a same livestreaming video.

In an example, the first display module 902 is configured to display a first video livestreaming page, the first video livestreaming page comprising a first identifier and a first livestreaming room, the first livestreaming room playing a first video corresponding to a first livestreaming video stream, and the first livestreaming video stream being any one of the plurality of livestreaming video streams. In another example, the first display module 902 is configured to display a first video livestreaming page corresponding to a first livestreaming room; the first video livestreaming page displays a first identifier, the first livestreaming room plays a first video corresponding to a first livestreaming video stream, and the first livestreaming video stream is any one of the plurality of livestreaming video streams.

In an example, the second display module 903 is configured to, in response to a first triggering operation for the first identifier, display a plurality of second identifiers on the first video livestreaming page, one second identifier of the plurality of second identifiers being correspondingly related to one livestreaming video stream of the plurality of livestreaming video streams. In another example, the second display module 903 is configured to, in response to a first triggering operation for the first identifier, display a plurality of second identifiers on the first video livestreaming page; the plurality of second identifiers correspond to the plurality of livestreaming video streams.

In an example, the livestreaming processing module 904 is configured to, in response to a second triggering operation for a target identifier, switch to a second livestreaming video stream corresponding to the target identifier to play a second video corresponding to the second livestreaming video stream in the first livestreaming room, the target identifier being one of the plurality of second identifiers and the second livestreaming video stream being different from the first livestreaming video stream. In another example, the livestreaming processing module 904 is configured to, in response to a second triggering operation for a target identifier, switch to a second livestreaming video stream corresponding to the target identifier to play a second video corresponding to the second livestreaming video stream in the first livestreaming room; the target identifier is one of the plurality of second identifiers.

Alternatively, in some embodiments of the present disclosure, the apparatus further comprises: a first data acquisition module, configured to acquire a first attribute parameter of the first livestreaming video stream; the first data acquisition module, configured to acquire a second attribute parameter of the second livestreaming video stream; and an interface update module, configured to, in response to determining that the second attribute parameter is different from the first attribute parameter, update a first user interface currently displayed in the first livestreaming room to a second user interface. The second user interface is different from the first user interface and is related to the second livestreaming video stream. The livestreaming processing module 904 is further configured to play the second video corresponding to the second livestreaming video stream in the first livestreaming room that is updated.

Alternatively, in some embodiments of the present disclosure, the first attribute parameter and the second attribute parameter each comprises a video image ratio.

Alternatively, in some embodiments of the present disclosure, the apparatus further comprises a livestreaming room jump module, configured to: display a third identifier on the first video livestreaming page; in response to a third triggering operation for the third identifier, display at least one preset livestreaming room identifier on the first video livestreaming page; and in response to a fourth triggering operation for a designated livestreaming room identifier, switch to a second video livestreaming page corresponding to the designated livestreaming room identifier, the second video livestreaming page comprising a second livestreaming room, the second livestreaming room playing a third video. The designated livestreaming room identifier is any one of the at least one preset livestreaming room identifier, and the third video is related to the first video.

Alternatively, in some embodiments of the present disclosure, the livestreaming room jump module is configured to: acquire video content information of the first video in response to the third triggering operation for the third identifier; determine, based on the video content information, at least one target livestreaming room related to the video content information from a set of livestreaming rooms, the set of livestreaming rooms comprising a plurality of livestreaming rooms that are broadcasting live; acquire at least one livestreaming room identifier respectively corresponding to the at least one target livestreaming room, and take the at least one livestreaming room identifier respectively corresponding to the at least one target livestreaming room as the at least one preset livestreaming room identifier; and display the at least one preset livestreaming room identifier in a designated region on the first video livestreaming page.

Alternatively, in some embodiments of the present disclosure, the livestreaming room jump module is configured to: in response to the fourth triggering operation for the designated livestreaming room identifier, display a control for reminding to switch livestreaming pages, the control comprising a first sub-control and a second sub-control; in response to detecting a fifth triggering operation for the first sub-control, switch to the second video livestreaming page corresponding to the designated livestreaming room identifier; and in response to detecting a sixth triggering operation for the second sub-control, skip switching and still display the first video livestreaming page.

Alternatively, in some embodiments of the present disclosure, the apparatus further comprises a message prompt module, configured to display a prompt message at a second identifier, corresponding to the first livestreaming video stream, among the plurality of second identifiers when the second display module 903 displays the plurality of second identifiers on the first video livestreaming page.

With respect to the apparatus in the above embodiment, the specific method in which each module performs an operation and the corresponding technical effect brought about have already been described correspondingly in detail in the embodiments related to the method, and will not be described in detail herein.

It should be noted that although a plurality of modules or units of the device for action execution are mentioned in the above detailed description, such division is not mandatory. Actually, according to the implementations of the present disclosure, features and functions of two or more modules or units described above can be embodied in one module or unit. Conversely, the features and functions of one module or unit described above can be further divided to be embodied by a plurality of modules or units. Parts displayed as modules or units may be or may not be physical units, that is, may be located in one position or may be distributed on a plurality of network units. Part or all of the modules may be selected according to actual needs to achieve the purpose of the solution of the present disclosure. Those of ordinary skill in the art may understand and implement the solution of the present disclosure without any inventive work.

An embodiment of the present disclosure further provides a non-transitory computer-readable storage medium, on which a computer program is stored. The computer program is executed by a processor to implement the steps of the network livestreaming method described in any one of the above embodiments.

Illustratively, the readable storage medium may be, for example, but not limited to, an electric, magnetic, optical, electromagnetic, infrared, or semiconductor system, apparatus, or device, or any combination of them. More specific examples (a non-exhaustive list) of the readable storage medium may include: an electrical connection having one or more wires, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of them.

The computer-readable storage medium may include a data signal that propagates in a baseband or as a part of a carrier wave and carries readable program codes. The data signal propagating in such a manner may take a variety of forms, including but not limited to an electromagnetic signal, an optical signal, or any appropriate combination thereof. The readable storage medium may also be any readable medium other than the readable storage medium. The readable medium may send, propagate, or transmit a program used by or in combination with an instruction execution system, apparatus, or device. The program code contained on the readable storage medium may be transmitted by using any suitable medium, including but not limited to wireless, wired, a fiber-optic cable, radio frequency (RF), and the like, or any appropriate combination of them.

Figure 10:
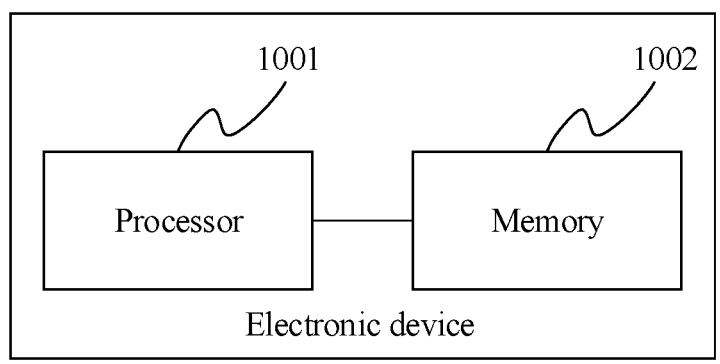
FIG. 10 is a schematic diagram of an electronic device for implementing a network livestreaming method according to an embodiment of the present disclosure.

An embodiment of the present disclosure further provides an electronic device. As shown in FIG. 10, the electronic device includes a processor 1001 and a memory 1002, and the memory 1002 is used to store a computer program. The processor 1001 is configured to execute the computer program to perform the steps of the network livestreaming method described in any one of the above embodiments.

Illustratively, the electronic device may be a smartphone, a tablet computer, or a notebook computer, and the embodiments do not limit this.

It should be noted that in the specification, the relational terms such as "first", "second", etc. are only used for distinguishing one entity or operation from another entity or operation, and do not necessarily require or imply any such actual relationship or order between these entities or operations. Moreover, the term "comprise/include", "contain", and any variations thereof are intended to cover non-exclusive inclusion, such that a process, method, article, or device including a series of elements includes not only those elements, but also other elements not explicitly listed or elements inherent to such process, method, article, or device. Without further restrictions, an element defined by the phrase "comprising/including one" does not exclude the existence of other identical elements in the process, method, article, or device including the element.

What has been described above is only the specific implementation of the present disclosure, so that those skilled in the art can understand or implement the present disclosure. Various modifications to these embodiments will be apparent to those skilled in the art, and the general principles defined herein can be implemented in other embodiments without departing from the spirit or scope of the present disclosure. Therefore, the present disclosure will not be limited to the embodiments described herein, but is to be accorded the widest scope consistent with the principles and novel features disclosed herein.

The invention claimed is:

1. A livestreaming method, comprising:
receiving a plurality of live streams, wherein the plurality of live streams correspond to a plurality of different viewing angles of a same livestreaming video;
displaying a first video livestreaming page corresponding to a first livestreaming channel, wherein the first video livestreaming page displays a first identifier, the first livestreaming channel plays a first video corresponding to a first live stream, and the first live stream is a live stream of the plurality of live streams;
in response to a first triggering operation for the first identifier, displaying a plurality of second identifiers on the first video livestreaming page, wherein the plurality of second identifiers correspond to the plurality of live streams; and
displaying a prompt information on a second identifier, corresponding to the first live stream, among the plurality of second identifiers when displaying the plurality of second identifiers on the first video livestreaming page, wherein the prompt information comprises a dynamic effect;
in response to a second triggering operation for a target identifier, switching to a second live stream corresponding to the target identifier to play a second video corresponding to the second live stream in the first livestreaming channel, wherein the target identifier is one of the plurality of second identifiers.

2. The livestreaming method according to claim 1, wherein the method further comprises:
acquiring a first attribute parameter of the first live stream;
acquiring a second attribute parameter of the second live stream;
in response to determining that the second attribute parameter is different from the first attribute parameter, updating a first user interface currently displayed in the first livestreaming channel to a second user interface, wherein the second user interface is different from the first user interface and is related to the second live stream; and
playing the second video corresponding to the second live stream in the first livestreaming channel that is updated.

3. The livestreaming method according to claim 2, wherein the first attribute parameter and the second attribute parameter each comprises a video image ratio.

4. The livestreaming method according to claim 3, wherein the method further comprises:
displaying a third identifier on the first video livestreaming page;
in response to a third triggering operation for the third identifier, displaying at least one preset livestreaming channel identifier on the first video livestreaming page; and
in response to a fourth triggering operation for a designated livestreaming channel identifier, switching to a second video livestreaming page corresponding to the designated livestreaming channel identifier, the second video livestreaming page displaying a second livestreaming channel, the second livestreaming channel playing a third video; wherein the designated livestreaming channel identifier is any one of the at least one preset livestreaming channel identifier, and the third video is related to the first video.

5. The livestreaming method according to claim 4, wherein the in response to a third triggering operation for the third identifier, displaying at least one preset livestreaming channel identifier on the first video livestreaming page comprises:

acquiring video content information of the first video in response to the third triggering operation for the third identifier;

determining, based on the video content information, at least one target livestreaming channel related to the video content information from a set of livestreaming channels, the set of livestreaming channels comprising a plurality of livestreaming channels that are broadcasting live;

acquiring at least one livestreaming channel identifier respectively corresponding to the at least one target livestreaming channel, and taking the at least one livestreaming channel identifier respectively corresponding to the at least one target livestreaming channel as the at least one preset livestreaming channel identifier; and displaying the at least one preset livestreaming channel identifier in a designated region on the first video livestreaming page.

6. The livestreaming method according to claim 4, wherein the in response to a fourth triggering operation for a designated livestreaming channel identifier, switching to a second video livestreaming page corresponding to the designated livestreaming channel identifier comprises:

in response to the fourth triggering operation for the designated livestreaming channel identifier, displaying a control for reminding to switch livestreaming pages, wherein the control comprises a first sub-control and a second sub-control;

in response to detecting a fifth triggering operation for the first sub-control, switching to the second video livestreaming page corresponding to the designated livestreaming channel identifier; and in response to detecting a sixth triggering operation for the second sub-control, skipping switching and still displaying the first video livestreaming page.

7. The livestreaming method according to claim 2, wherein the method further comprises:

displaying a third identifier on the first video livestreaming page;

in response to a third triggering operation for the third identifier, displaying at least one preset livestreaming channel identifier on the first video livestreaming page; and in response to a fourth triggering operation for a designated livestreaming channel identifier, switching to a second video livestreaming page corresponding to the designated livestreaming channel identifier, the second video livestreaming page displaying a second livestreaming channel, the second livestreaming channel playing a third video; wherein the designated livestreaming channel identifier is any one of the at least one preset livestreaming channel identifier, and the third video is related to the first video.

8. The livestreaming method according to claim 7, wherein the in response to a third triggering operation for the third identifier, displaying at least one preset livestreaming channel identifier on the first video livestreaming page comprises:

acquiring video content information of the first video in response to the third triggering operation for the third identifier;

determining, based on the video content information, at least one target livestreaming channel related to the video content information from a set of livestreaming channels, the set of livestreaming channels comprising a plurality of livestreaming channels that are broadcasting live;

acquiring at least one livestreaming channel identifier respectively corresponding to the at least one target livestreaming channel, and taking the at least one livestreaming channel identifier respectively corresponding to the at least one target livestreaming channel as the at least one preset livestreaming channel identifier; and displaying the at least one preset livestreaming channel identifier in a designated region on the first video livestreaming page.

9. The livestreaming method according to claim 7, wherein the in response to a fourth triggering operation for a designated livestreaming channel identifier, switching to a second video livestreaming page corresponding to the designated livestreaming channel identifier comprises:

in response to the fourth triggering operation for the designated livestreaming channel identifier, displaying a control for reminding to switch livestreaming pages, wherein the control comprises a first sub-control and a second sub-control;

in response to detecting a fifth triggering operation for the first sub-control, switching to the second video livestreaming page corresponding to the designated livestreaming channel identifier; and in response to detecting a sixth triggering operation for the second sub-control, skipping switching and still displaying the first video livestreaming page.

10. The livestreaming method according to claim 1, wherein the method further comprises:

displaying a third identifier on the first video livestreaming page;

in response to a third triggering operation for the third identifier, displaying at least one preset livestreaming channel identifier on the first video livestreaming page; and in response to a fourth triggering operation for a designated livestreaming channel identifier, switching to a second video livestreaming page corresponding to the designated livestreaming channel identifier, the second video livestreaming page displaying a second livestreaming channel, the second livestreaming channel playing a third video; wherein the designated livestreaming channel identifier is any one of the at least one preset livestreaming channel identifier, and the third video is related to the first video.

11. The livestreaming method according to claim 10, wherein the in response to a third triggering operation for the third identifier, displaying at least one preset livestreaming channel identifier on the first video livestreaming page comprises:

acquiring video content information of the first video in response to the third triggering operation for the third identifier;

determining, based on the video content information, at least one target livestreaming channel related to the video content information from a set of livestreaming channels, the set of livestreaming channels comprising a plurality of livestreaming channels that are broadcasting live;

acquiring at least one livestreaming channel identifier respectively corresponding to the at least one target livestreaming channel, and taking the at least one livestreaming channel identifier respectively corresponding to the at least one target livestreaming channel as the at least one preset livestreaming channel identifier; and displaying the at least one preset livestreaming channel identifier in a designated region on the first video livestreaming page.

12. The livestreaming method according to claim 11, wherein the in response to a fourth triggering operation for a designated livestreaming channel identifier, switching to a second video livestreaming page corresponding to the designated livestreaming channel identifier comprises:

in response to the fourth triggering operation for the designated livestreaming channel identifier, displaying a control for reminding to switch livestreaming pages, wherein the control comprises a first sub-control and a second sub-control;

in response to detecting a fifth triggering operation for the first sub-control, switching to the second video livestreaming page corresponding to the designated livestreaming channel identifier; and in response to detecting a sixth triggering operation for the second sub-control, skipping switching and still displaying the first video livestreaming page.

13. The livestreaming method according to claim 10, wherein the in response to a fourth triggering operation for a designated livestreaming channel identifier, switching to a second video livestreaming page corresponding to the designated livestreaming channel identifier comprises:

in response to the fourth triggering operation for the designated livestreaming channel identifier, displaying a control for reminding to switch livestreaming pages, wherein the control comprises a first sub-control and a second sub-control;

in response to detecting a fifth triggering operation for the first sub-control, switching to the second video livestreaming page corresponding to the designated livestreaming channel identifier; and in response to detecting a sixth triggering operation for the second sub-control, skipping switching and still displaying the first video livestreaming page.

14. The livestreaming method according to claim 1, wherein the second live stream is different from the first live stream.

15. A non-transitory computer-readable storage medium, wherein the non-transitory computer-readable storage medium stores a computer program, the computer program is executed by a processor to implement steps of the livestreaming method according to claim 1.

16. An electronic device, comprising:

a processor; and a memory, used to store a computer program;

wherein the processor is configured to execute the computer program to perform steps of the livestreaming method according to claim 1.

* * * * *